(12) United States Patent
Yang et al.

(10) Patent No.: US 11,372,262 B2
(45) Date of Patent: *Jun. 28, 2022

(54) TEMPLE ASSEMBLY FOR SPECTACLES AND SPECTACLES

(71) Applicant: WENZHOU WEILAN OPTICAL CO., LTD., Wenzhou (CN)

(72) Inventors: Yufeng Yang, Zhejiang (CN); Xindong Jiang, Zhejiang (CN)

(73) Assignee: WENZHOU WEILAN OPTICAL CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/342,009

(22) Filed: Jun. 8, 2021

(65) Prior Publication Data
US 2021/0318554 A1 Oct. 14, 2021

Related U.S. Application Data

(63) Continuation of application No. PCT/CN2020/070830, filed on Jan. 8, 2020.

(30) Foreign Application Priority Data
Jan. 11, 2019 (WO) ................ PCT/CN2019/071437

(51) Int. Cl.
*G02C 5/14* (2006.01)
*G02C 5/16* (2006.01)
*G02C 5/22* (2006.01)

(52) U.S. Cl.
CPC ............. *G02C 5/146* (2013.01); *G02C 5/16* (2013.01); *G02C 5/2227* (2013.01); *G02C 5/2263* (2013.01); *G02C 2200/26* (2013.01)

(58) Field of Classification Search
CPC ........ G02C 5/146; G02C 5/16; G02C 5/2263; G02C 5/2227; G02C 2200/26
(Continued)

(56) References Cited

U.S. PATENT DOCUMENTS 5,473,395 A * 12/1995 Huang ................... G02C 5/006
16/228
6,027,215 A 2/2000 Hsu
(Continued)

FOREIGN PATENT DOCUMENTS

CN 2235624 Y 9/1996
CN 2507033 Y 8/2002
(Continued)

OTHER PUBLICATIONS

PCT/CN2020/070830 International Search Report prepared by the CN patent Office.

*Primary Examiner* — Tuyen Tra
(74) *Attorney, Agent, or Firm* — Brooks Kushman P.C.

(57) ABSTRACT

A temple assembly for a pair of spectacles, including a spectacle temple body, a guide member, a first temple core, a second temple core, a first pivot; and a second pivot; the second temple core is elastically connected with the spectacle temple body, the guide member is sleeved on a periphery of the first temple core, and the first temple core includes a first connecting end and a second connecting end disposed opposite to each other, the second connecting end is pivotally connected to the second temple core via the second pivot, the first connecting end is pivotally connected to a pile head of a rim or an end hinge of a spectacle temple via the first pivot; the first pivot and the second pivot are disposed perpendicular to each other; and the guide member is elastically abutted the spectacle temple body.

22 Claims, 11 Drawing Sheets

(58) Field of Classification Search
USPC .................................................... 351/41, 111
See application file for complete search history.

(56) References Cited

U.S. PATENT DOCUMENTS

| | | | |
|---|---|---|---|
| 6,409,336 B1 | 6/2002 | Kuo | |
| 6,454,406 B1 * | 9/2002 | Guo | G02C 5/20 351/119 |
| 6,644,803 B1 | 11/2003 | Jung | |
| 6,776,483 B1 * | 8/2004 | Wu | G02C 5/20 351/119 |
| 6,863,396 B1 * | 3/2005 | Chen | G02C 5/2209 351/110 |
| 7,380,935 B2 | 6/2008 | Ifergan | |
| 7,543,932 B1 * | 6/2009 | Isabelle | G02C 5/124 351/111 |
| 7,637,609 B1 * | 12/2009 | Ifergan | G02C 5/10 16/228 |
| 10,365,501 B2 | 7/2019 | Yang et al. | |
| 11,187,919 B2 * | 11/2021 | Yang | G02C 5/2263 |
| 2018/0129069 A1 | 5/2018 | Perdichizzi | |
| 2018/0210227 A1 | 7/2018 | Yang et al. | |

FOREIGN PATENT DOCUMENTS

| | | |
|---|---|---|
| CN | 201000515 Y | 1/2008 |
| CN | 102007442 A | 4/2011 |
| CN | 204650079 U | 9/2015 |
| CN | 204945514 U | 1/2016 |
| CN | 105372830 A | 3/2016 |
| CN | 205301727 U | 6/2016 |
| CN | 205750152 U | 11/2016 |
| CN | 107688247 A | 2/2018 |
| CN | 207502845 U | 6/2018 |
| CN | 208172407 U | 11/2018 |
| JP | 2000019462 A | 1/2000 |
| WO | 2018146396 A1 | 8/2018 |

* cited by examiner

TEMPLE ASSEMBLY FOR SPECTACLES AND SPECTACLES

CROSS-REFERENCE TO RELATED APPLICATIONS

The present application is a continuation application based on PCT/CN2020/070830, filed on Jan. 8, 2020, and claims the benefit of PCT application PCT/CN2019/071437, filed on Jan. 11, 2019, which is incorporated herein by reference.

TECHNICAL FIELD

The present application belongs to the technical field of spectacle, and more particularly to a temple assembly for a pair of spectacles and a pair of spectacles.

BACKGROUND

At present, a spectacle commonly includes a pair of rims, lenses and spectacle temples, wherein the rim is connected to the spectacle temple via an elastic hinge for elastic closure and elastic expansion in the horizontal direction. However, when people put on or take off their spectacles, they often inadvertently bring unexpected loads to the spectacle frame, it is especially easy to apply forces outside the horizontal direction to the spectacle temples, such as vertical forces, which are easy to deform the spectacle temples after multiple actions of putting on or taking off their spectacles. In severe cases, it affects the aesthetics of the spectacle frames and the comfort of people.

Technical Problem

An object of the present application is to provide a temple assembly for a pair of spectacles and a pair of spectacles, which including, but not limited to, solving the technical problems that the spectacle temples are subjected to vertical loads can cause unrecoverable deformation of the spectacle frame, and bad experience of multi-directional rotating temples shaking randomly in four directions.

SUMMARY

The present application provides a temple assembly for a pair of spectacles, including a spectacle temple body, a guide member, a first temple core, a second temple core, a first pivot; and a second pivot; wherein the second temple core is elastically connected with the spectacle temple body and configured to provide an elastic force along a lengthwise direction of the spectacle temple body, the guide member is sleeved onto a periphery of the first temple core, and the first temple core comprises a first connecting end and a second connecting end which are disposed opposite to each other, the second connecting end being pivotally connected to the second temple core via the second pivot, the first connecting end being pivotally connected with a pile head of a rim or an end hinge of a spectacle temple via the first pivot; the first pivot and the second pivot are arranged perpendicular to each other; and the guide member is in elastic abutment against the spectacle temple body.

Optionally, the guide member is provided with a through hole, the first temple core is disposed passing through the through hole such that the guide member is sleeved onto a periphery of the first temple core, and the through hole is configured to define the first temple core reciprocating along an axis of the through hole.

Optionally, the first temple core and the guide member are constrained to have a relative movement in same direction as an axial direction of the first pivot.

Optionally, the guide member is provided with a through hole, the second connecting end of the first temple core passes through the through hole and extends into the spectacle temple body, and the second connecting end is pivotally connected to the second temple core by the second pivot in the spectacle temple body.

Optionally, a shape of a cross-section of a part of the first temple core located between the first connecting end and the second connecting end is matched with that of a cross-section of a through hole of the guide member, to limit the guide member can only move axially relative to the first temple core, to limit rotating circumferentially.

Optionally, the guide member is provided with a through hole, and an inner wall of the through hole is provided with a first axial limiting groove, an outer surface of the first temple core is provided with an axial limiting rib matched with the first axial limiting groove, and the axial limiting rib extends into the first axial limiting groove when the first temple core passes through the through hole, such that the first temple core moves along the through hole to limit rotating circumferentially.

Optionally, the axes of the first pivot are horizontally or vertically arranged.

Optionally, the guide member is provided with a through hole, the temple assembly further comprises the end hinge of the spectacle temple, and the end hinge of the spectacle temple comprises a hinge lug extending into the through hole and pivotally connected to the first connecting end.

Optionally, the guide member is protruded with a limiting portion extending forward from an end of the guide member away from the spectacle temple body.

Optionally, the temple assembly further comprises a pile head connected with the first temple core and abutted against the guide member;

wherein an outer end surface of the pile head abutted against the guide member is provided with an outer convex portion, the limiting portion is provided with a concave groove, and the outer convex portion is matched with the concave groove to limit circumferential rotation between the pile head and the guide member; or the limiting portion is convex, and an outer end surface of the pile head abutted against the guide member is provided with a concave groove, and the limiting portion is matched with the concave groove to limit circumferential rotation between the pile head and the guide member.

Optionally, a front end surface of the spectacle temple body is provided with a convex portion, a rear end surface of the guide member is provided with a concave portion, and the convex portion is matched with the concave portion to limit circumferential rotation between the spectacle temple body and the guide member; or a rear end surface of the guide member is provided with a convex portion, a front end surface of the spectacle temple body is provided with a concave portion, and the convex portion is matched with the concave portion to limit circumferential rotation between the spectacle temple body and the guide member.

Optionally, an end of the spectacle temple body adjacent to the guide member is provided with a receiving cavity, the second temple core is received in the receiving cavity and the second temple core is elastically stretchable along the length of the spectacle temple body.

Optionally, the second connecting end is extended into the receiving cavity and pivotally connected to the second temple core.

Optionally, the second temple core comprises:
a fixing member, fixedly connected to the spectacle temple body;
a movable member, movably connected to the fixing member; wherein the movable member is reciprocally movable along the lengthwise direction of the spectacle temple body, and an front end of the movable member is provided with a pivot hole configured for the second pivot to pass through; and
a spring;
wherein an end of the spring abuts against the fixing member, and the other end thereof abuts against the movable member.

Optionally, the fixing member, the movable member and the spring are distributed along the lengthwise direction of the spectacle temple body.

Optionally, the movable member comprises a hinge head and a spring core rod, the pivot hole is disposed at a front end of the hinge head, and the spring core rod is fixedly connected to the hinge head or integrally formed with the hinge head, the spring is sleeved on the spring core rod, and a rear end of the spring core rod is provided with a spring stop.

Optionally, the fixing member is a fixed locking block sleeved on the spring core rod, and the fixing member is provided with a screw hole or a pin hole.

Optionally, the fixing member is provided with a second axial limiting groove configured for the spring core rod passing through, the spring core rod is matched with the second axial limiting groove, such that the spring core rod is axially moved along the second axial limiting groove.

Optionally, the movable member comprises a frame, a front end of the frame is provided with the pivot hole, and the frame is configured to pull the spring received in the frame out of the receiving cavity of the spectacle temple body, and the fixing member is configured to prevent the spring from being pulled out of the receiving cavity by the frame.

Optionally, an end of the fixing member is extended into the frame, the spring is sleeved on a periphery of the fixing member and defined in the frame, and the other end of the fixing member passes through a rear end of the frame and is fixedly connected to the spectacle temple body.

Optionally, the second temple core comprises:
a movable member, received in the receiving cavity and reciprocally movable along the lengthwise direction of the spectacle temple body, wherein a front end of the moveable member is provided with a pivot hole; and
a spring, can be pulled toward the out of the receiving cavity by the movable member, wherein the receiving cavity is provided with a blocking portion therein, and the blocking portion is configured to prevent the spring from being pulled out of the receiving cavity by the movable member.

The present application further provides a pair of spectacles, comprising: a spectacle frame and lenses, wherein the spectacle frame comprises a pair of rims configured to inlay the lenses thereon; and
a temple assembly for a pair of spectacles, the temple assembly comprising:
a spectacle temple body;
a first temple core comprising a first connecting end and a second connecting end which are disposed opposite to each other;
a second temple core elastically connected to the spectacle temple body and configured to provide an elastic force along a lengthwise direction of the spectacle temple body;
a first pivot, configured to pivotally connect the first connecting end with a pile head of a rim or an end hinge of a spectacle temple;
a second pivot, disposed perpendicular to the first pivot and configured to connect the second connection end with the second temple core; and
a guide member, sleeved onto a periphery of the first temple core and in elastic abutment against the spectacle temple body and configured to define a swinging position and a swinging direction of the spectacle temple body.

BENEFICIAL EFFECTS

The present application provides a temple assembly for the pair of spectacles, wherein the first temple core is cooperated with the guide member, and the first temple core and the second temple core are cooperated with the guide member and the spectacle temple body, such that the guide member functions to define the swinging direction and the swing position of the spectacle temples, and when the spectacle temples are subjected to loads in two different directions from a horizontal direction and a vertical direction, the spectacle temples cause to produce an elastic bend or an elastic swing of different directions at a front end and a rear end of the guide member, that is, the guide member is rotated in a horizontal direction relative to the pile head, and the guide member is rotated in a vertical direction relative to the spectacle temple, or the guide member is rotated in a vertical direction relative to the pile head, and the guide member is rotated in a horizontal direction relative to the spectacle temple. While slowing down or eliminating the bad load on the spectacle temples in the vertical direction, it also increases the life of the most important hinge shaft on the spectacle temples, the technical problem that the spectacle temples cannot bear the vertical load is effectively solved and prevented the spectacle temples from accidental deforming, and the feeling of random sway caused by elastic bending or elastic swing in two directions in the same portion of the spectacle frame is avoided, the user experience that the temples can be rotated 360 degrees is better.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

Figure 1:
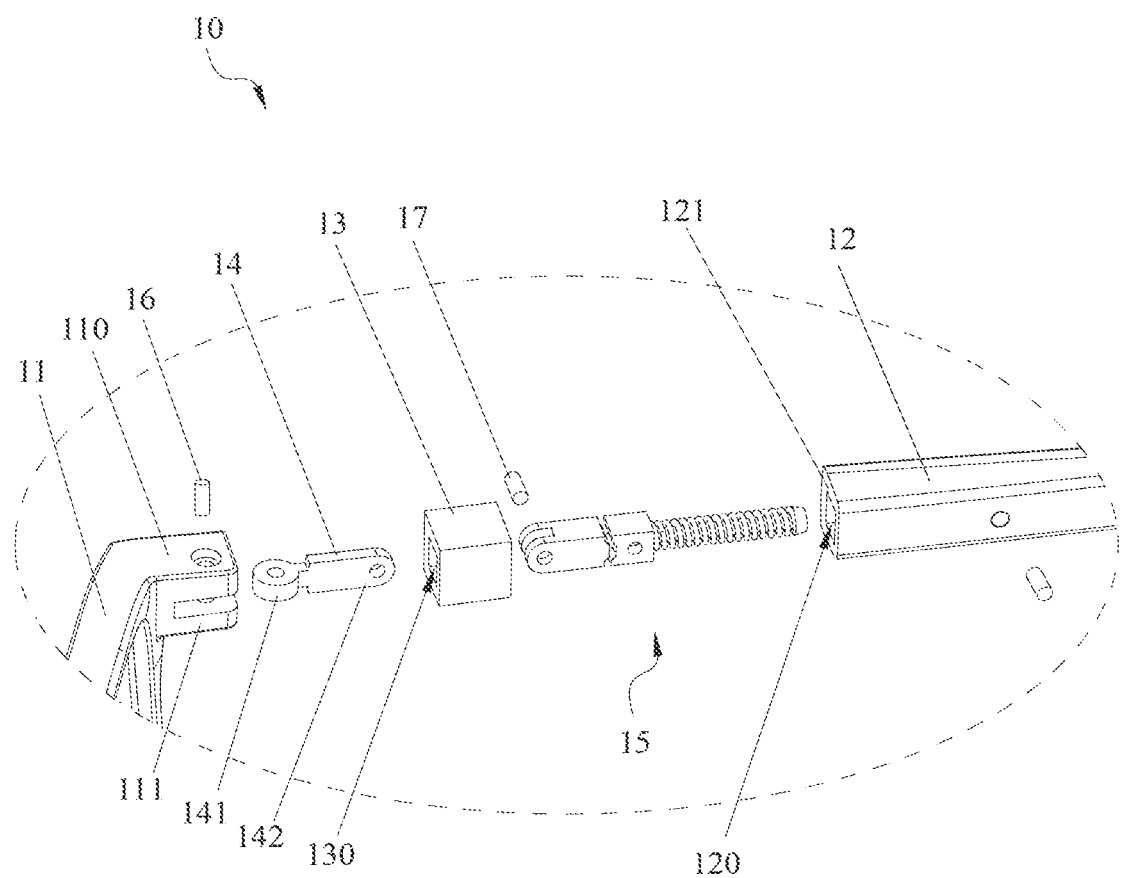
FIG. 1 is a partially exploded perspective view of a temple assembly for a pair of spectacles according to an embodiment 1 of the present application.

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed on" another component, it can be directly or indirectly on another component. When a component is referred to as being "connected to" another component, it can be directly or indirectly connected to another component.

In the description of the present application, it needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

The temple assembly for the pair of spectacles and the pair of spectacles are described herein.

Embodiment 1

Referring to FIGS. 1 to 5, the spectacle frame 10 includes a rim 11 and a temple assembly for the pair of spectacles; the temple assembly includes: a spectacle temple body 12, a guide member 13, a first temple core 14, a second temple core 15, a first pivot 16, and a second pivot 17. The guide member 13 is sleeved onto the periphery of the first temple core 14, and the second temple core 15 is elastically connected to the spectacle temple body 12 to provide the elastic force along the lengthwise direction of the spectacle temple body 12, the rear end of the first temple core 14 and the front end of the second temple core the 15 are pivotally connected by the second pivot 17, the front end of the first temple core 14 is connected to the first pivot 16, so that it can be pivotally connected to the rim 11; when the temple assembly is mounted to the rim 11, the first temple core 14 is connected to the second temple core 15 and the guide member 13 is connected in series with the spectacle temple body 12, so that the two are elastically attached. That is, due that the second temple core is elastically connected with the spectacle temple body and provides an elastic force along a lengthwise direction of the spectacle temple body, so that the guide member is in elastic abutment against the spectacle temple body after the assembling of the temple assembly. Herein, in the embodiment of the present application, the axes of the first pivot 16 are horizontally arranged, and the axes of the second pivots 17 are vertically arranged.

Further, referring to FIGS. 1 to 5, in the embodiment of the present application, the rim 11 is provided with a pile head 110, the guide member 13 is sandwiched between the pile head 110 and the spectacle temple body 12, and the pile head 110 includes a hinge lug of the pile head 111 connected to the first temple core, when the spectacle temple is in an open state relative to the rim, an end face opposite to the front end face of the guide member on the hinge lug of the pile head 111 abuts the front end face of the guide member; an end of the spectacle temple body 12 facing the guide member 13 is provided with a receiving cavity 120, and the receiving cavity 120 extends from the end of the spectacle temple body 12 that abuts the guide member 13 to the inside of the spectacle temple body 12. The second temple core 15 is mounted in the receiving cavity 120 and is elastically expandable in the longitudinal direction of the spectacle temple body 12 in the receiving cavity. The elastic connection of the second temple core 15 to the spectacle temple body 12 provides an elastic force along the lengthwise direction of the spectacle temple body 12. When the first temple core 14 is connected to the second temple core 15 and the guide member 13 is connected in series with the spectacle temple body 12, and the temple assembly is mounted on the rim 11, the elastic connection of the second temple core 15 to the spectacle temple body 12 provides an elastic force required for elastic bending and elastic swinging of the spectacle temple.

Further, referring to FIGS. 1 to 5, in the embodiment of the present application, the guide member 13 is provided with a through hole 130, and the first temple core 14 is disposed passing through the through hole to form a guide member sleeved onto the periphery of the first temple core. The first temple core 14 can reciprocate in the axial direction of the through hole 130; the rear end of the first temple core extends the through hole to connect the second temple core 15. Moreover, it is provided that when the guide member 13 is connected in series with the spectacle temple body 12, the rear end of the first temple core 14 is extended into the receiving cavity 120 to be connected to the second temple core. This means that when the guide member 13 is in series with the spectacle temple body 12, the second pivot 17 is also located within the receiving cavity 120. Also, it is further provided such that the first temple core 14 and the guide member 13 are restricted from moving in the vertical direction. That is, there is no relatively movable gap between the first temple core 14 and the guide member 13 in the same direction as the axial direction of the first pivot 16. This makes it impossible for the guide member 13 to be relatively movable with respect to the pile head 110 if a force in the vertical direction is applied to the guide member 13; thus, when a force in the vertical direction is applied to the spectacle temple body 12, an elastic bending of the spectacle temple occurs only at the joint of the guide member 13 and the spectacle temple body 12, that is, the second temple core rotates about the second pivot with respect to the first temple core and the guide member 13. That is, the second connecting end of the first temple core is passing through the through hole 130 of the guide member to extend into the spectacle temple body, and the second connecting end is pivotally connected to the second temple core by the second pivot in the spectacle temple body, such that the rotation of the spectacle temple in a vertical direction occurs only at the joint between the rear end of the guide member and the spectacle temple body, however, the swing of the spectacle temple in a horizontal direction occurs at the front end of the guide member. If the first temple core 14 does not extend out of the guide member 13, and the second connecting end 142 and the second pivot 17 do not extend into the receiving cavity 120 of the spectacle temple body 12, the rotation and swinging of the spectacle temple in horizontal and vertical directions still occur between the guide member 13 and the pile head 110, resulting in a bad wearing experience in which the spectacle temples swing randomly in four directions. It should be noted that the rotation of the spectacle temple body 12 in an up-down direction or the rotation in a vertical direction refers to the swing of the spectacle temple body 12 in the pitch direction.

Figure 2:
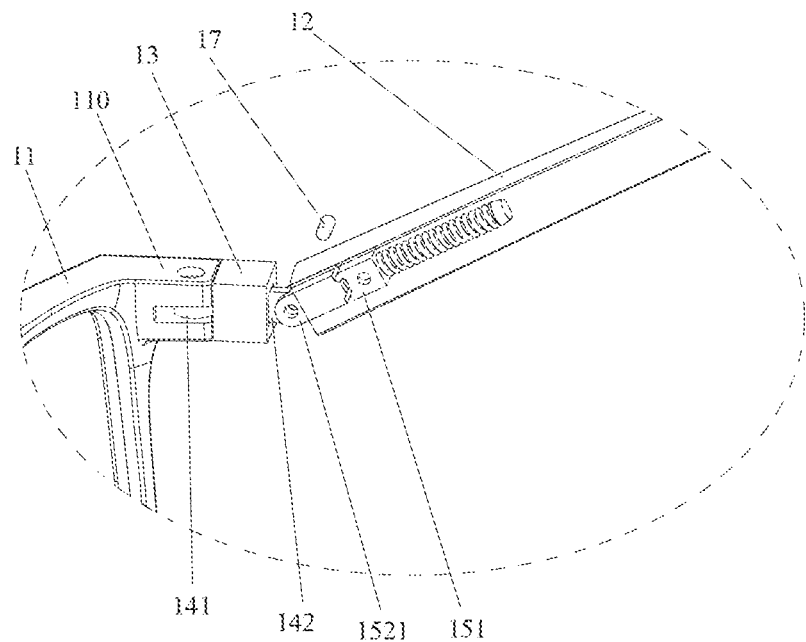
FIG. 2 is a partially exploded perspective view showing another angle of the temple assembly for the pair of spectacles of the embodiment 1 of the present application.

Further, the through hole 130 may be disposed to define that the first temple core 14 can only reciprocate along the axis of the through hole. In addition to the above-mentioned effects, this can also avoid the horizontal sway of the guide member and the first temple core. Referring to FIGS. 1 and 2, a shape of a cross-section of a part of the first temple core 14 located between the first connecting end 141 and the second connecting end 142 is a rectangle, and a shape of a cross-section of the through hole 130 of the guide member is also a rectangle, the shape of the cross-section of the two are matched with each other, to limit the guide member can only move axially relative to the first temple core, and cannot rotate circumferentially.

Figure 3:
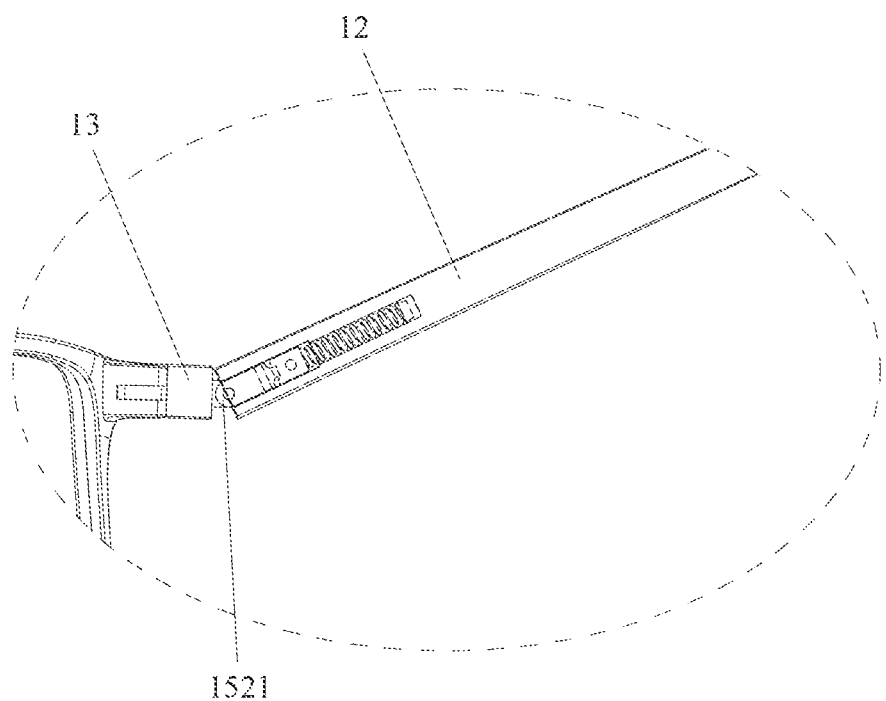
FIG. 3 is a schematic diagram of a working state of a temple assembly for a pair of spectacles according to an embodiment 1 of the present application.

However, unlike the cooperation between the first temple core and the guide member 13, the portion of the first temple core 14 that protrudes into the receiving cavity 120 and the inner wall of the receiving cavity 120 need to be provided with a movable gap in the vertical direction, such that the portion that protrudes can be rotated at a small angle in the receiving cavity with respect to the initial rotation of the receiving cavity, that is, rotating around the second pivot. Referring to FIGS. 2 and 3, FIG. 2 is a partial perspective exploded view of the embodiment of the present application, and FIG. 3 shows a working state of the embodiment of the present application, that is, a working state that the spectacle temple body 12 and the second temple core 15 installed in the receiving cavity 120 together rotates around the second pivot 17; here, when the spectacle temple body and the second temple core mounted in the receiving cavity rotate together about the second pivot, on one side of the second pivot, a side of the front end of the spectacle temple body 12 abuts against the rear end surface of the guide member 13, and when the external force applying on the spectacle temple body continues, the front end of the second temple core 15 is pulled out from the receiving cavity 120, and the spring is compression, when the external force applying on the temple body continues, the front end of the second temple core is pulled out more from the receiving cavity, and it can be seen that the second pivot is also pulled out of the receiving cavity y and protrudes from the front end face of the spectrum temple body 12, the spectacle temple body 12 can thus make a further rotation about the second pivot relative to the guide member 13 and the pile head.

Figure 4:
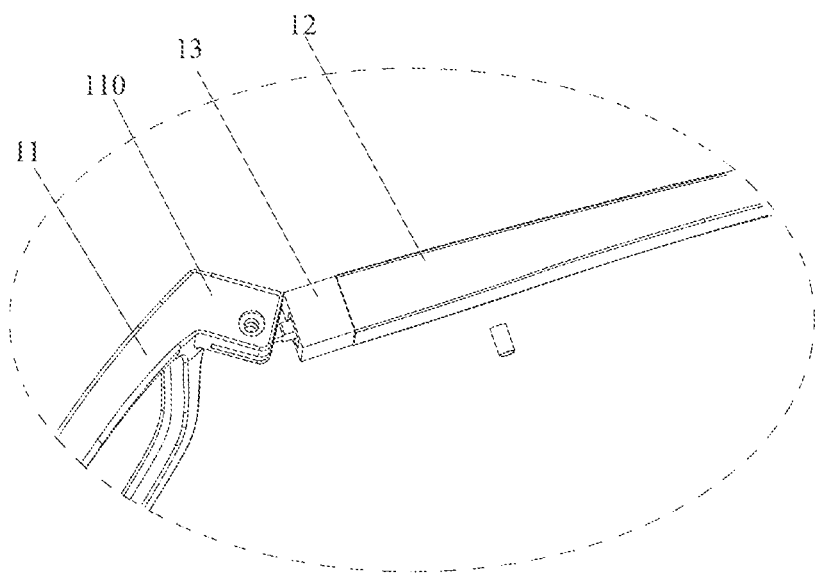
FIG. 4 is a schematic diagram of another working state of a temple assembly for a pair of spectacles according to an embodiment 1 of the present application.

The above structure can produce the effect that after the temple assembly for the pair of spectacles is mounted on the rim 11, when the spectacle temple body 12 is subjected to a horizontal force, the spectacle temple is separated from the rim at the front end of the spectacle temple which includes the guide member, and rotates around the first pivot to realize elastic closing and elastic opening of the spectacle temple relative to the rim 11, which is shown in FIG. 4; when the spectacle temple body 12 is subjected to a vertical force, the spectacle temple is separated from the joint of the guide member and the spectacle temple body and rotates around the second pivot, as shown in FIG. 3, which can slow or eliminate the vertical load and prevent the spectacle temple body 12 from being accidentally deformed. That is to say, in the structure of the embodiment of the present application, when the spectacle temples are subjected to loads in two different directions, elastic bending or elastic swing is generated at different positions on the spectacle temples, and when the spectacle temples are assembled to the rims, the feeling of random sway caused by elastic bending or elastic swing in horizontal and vertical directions at the same location of the spectacle temple body 12 of the rim is avoided, and the guide member 13 functions to define the swinging direction and the swinging position of the spectacle temple. The guide member 13 and the structural cooperation of the guide member 13 with other temple assemblies in the embodiment of the present application make the horizontal rotation of the spectacle temple body 12 only occur between the guide member 13 and the pile head 110, while the rotation of the spectacle temple body 12 in the vertical direction can only occur between the guide member 13 and the spectacle temple body 12. If there is no guide member 13, both the rotations of the spectacle temple body 12 in the horizontal direction and in the up-down direction are occurred between the spectacle temple body 12 and the pile head 110, resulting in bad wearing experience of random shaking caused by horizontal and vertical elastic bending or elastic swing generated by the spectacle temple body 12 at the same position. That is to say: the guide member 13 provides two preset different positions for the spectacle temple body 12 to rotate in the horizontal direction and up-down direction respectively, that is, the rotations occur at a front position and a rear position of the guide member 13, which not only meet the needs of multi-directional rotation of the spectacle temple body 12, but also avoid the bad experience of random shaking.

Figure 5:
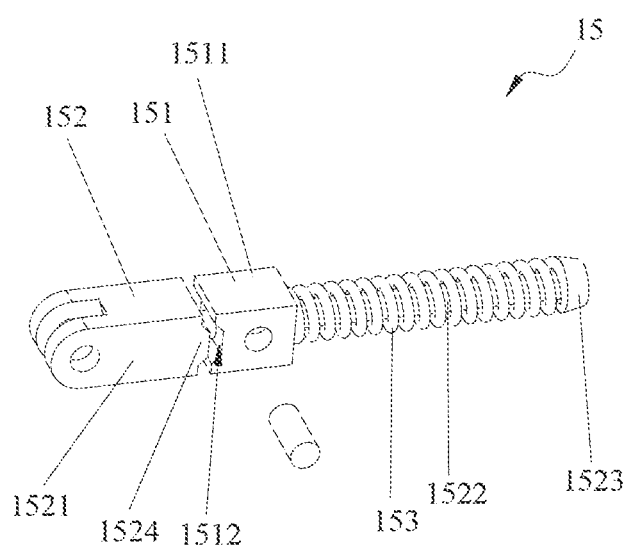
FIG. 5 is a perspective view of a second temple core in a temple assembly for a pair of spectacles according to an embodiment 1 of the present application.

Further, referring to FIGS. 1, 2 and 5, in the embodiment of the present application, the second temple core 15 includes a fixing member 151, a movable member 152, and a spring 153, wherein the fixing member 151 is fastened to the spectacle temple body 12, and the movable member 152 is movably connected with the fixing member 151, and the movable member 152 can reciprocate along the lengthwise direction of the spectacle temple body 12, the spring 153 is used to drive the movable member 152 to be reset, that is, the spring 153 applies a pushing force to the movable member 152 to keep the movable member 152 always returning to the original position. Here, the movable member 152, the fixing member 151, and the spring 153 are distributed along the lengthwise direction of the spectacle temple body 12, and one end of the spring 153 abuts the fixing member 151, and the other end of the spring 153 abuts the movable member 152. The elastic connection of the second temple core 15 to the spectacle temple body 12 is formed as described above. The front end of the movable member 152 is provided with a pivot hole for pivotally connecting with the second connecting end of the first temple core.

Further, referring to FIG. 5, in the embodiment of the present application, the movable member 152 includes a hinge head 1521 and a spring core rod 1522, and the front end of the hinge head is provided with a pivot hole for pivotally connecting with the second connection end of the first temple core, the spring core rod 1522 is fixed on the hinge head 1521. In other implementations of the present application, the spring core rod may also be integrally formed with the hinge head, and the spring 153 is disposed on the spring core rod 1522, and further includes a spring stop head 1523 disposed at the end of the spring core 1522. The fixing member 151 is a locking block 1511 disposed and sleeved on the spring core rod 1522, and is provided with a screw hole or a pin hole for fixing to the spectacle temple body 12. One end of the spring 153 abuts against the fixed locking block 1511, and the other end of the spring 153 abuts against the spring stop head 1523.

Further, referring to FIG. 5, in the embodiment of the present application, a protrusion 1524 is convexly disposed on the hinge head 1521. Accordingly, a limiting groove 1512 is defined on the fixing member 151, and the limiting groove 1512 and the protrusion are matched with each other, and the projection 1524 can extend into the limiting slot 1512 to form a positioning.

Embodiment 2

Figure 6:
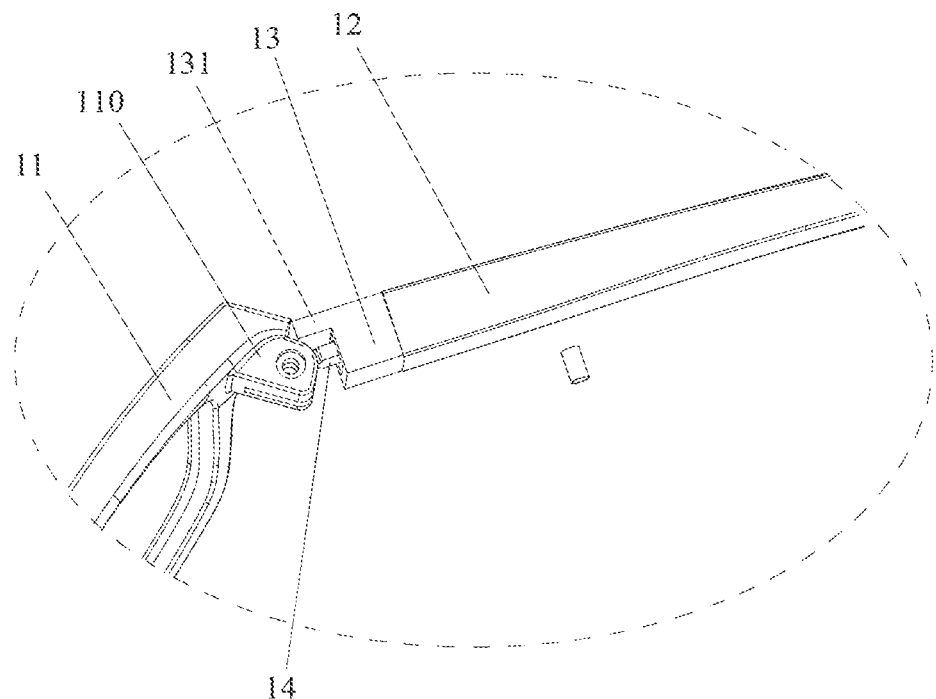
FIG. 6 is a schematic diagram of a working state of a temple assembly for a pair of spectacles according to an embodiment 2 of the present application.
Figure 7:
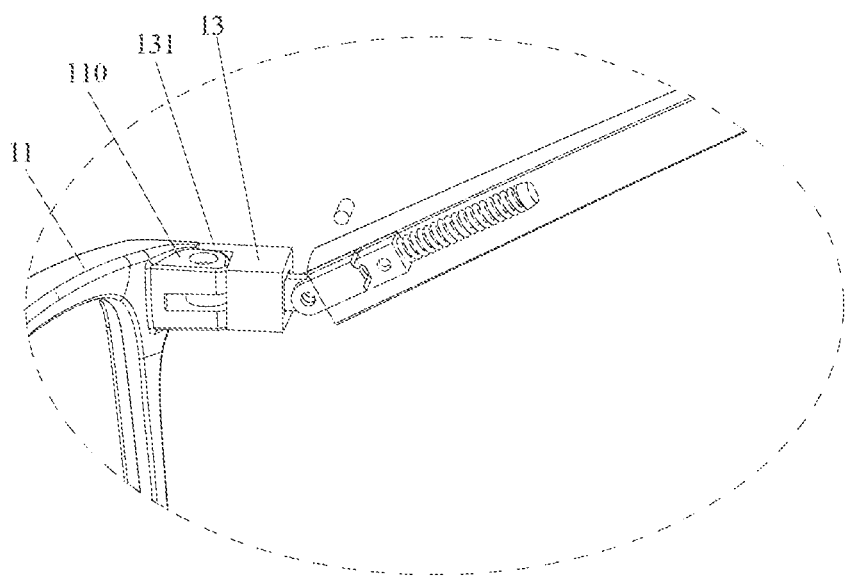
FIG. 7 is a schematic diagram of another working state of a temple assembly for a pair of spectacles according to an embodiment 2 of the present application.

Referring to FIG. 6 and FIG. 7, the temple assembly for the pair of spectacles provided in this embodiment is substantially the same as that in the embodiment 1, except that a limiting portion 131 is protruded on an end surface of the guide member 13 facing the pile head 110. Specifically, in the embodiment, the limiting portion 131 extends forward from the outer edge of the front end surface 121 of the guide member 13, forming an outer flange, when the spectacle temple which includes the guide member 13 and the spectacle temple body 12 is turned outward from the normal open state relative to the rim 11, the limiting portion 131 of the guide member abuts against the rim 11, so that the maximum angle at which the spectacle temples are outwardly reversed can be defined, and the elastic force of the spectacle temples outwardly reversed can be adjusted.

FIG. 6 shows that when the spectacle temple body 12 is subjected to a horizontal force, the spectacle temple is separated from the rim from the front end of the guide member, and is rotated about the first pivot to achieve elastically closed and elastic outwardly open of the spectacle temple relative to the rim 11.

Embodiment 3

Figure 8:
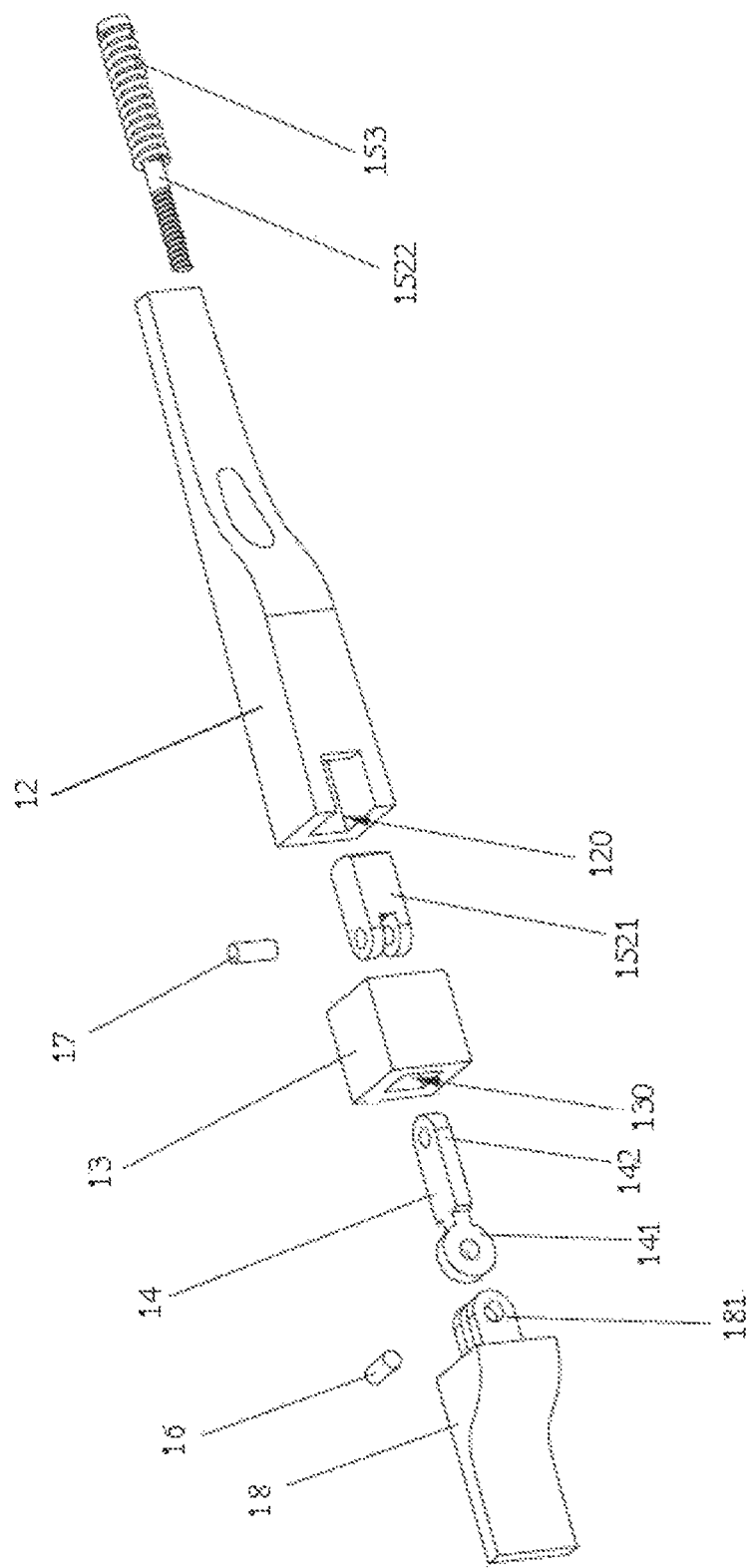
FIG. 8 is a perspective exploded view of a temple assembly for a pair of spectacles according to an embodiment 3 of the present application.
Figure 9:
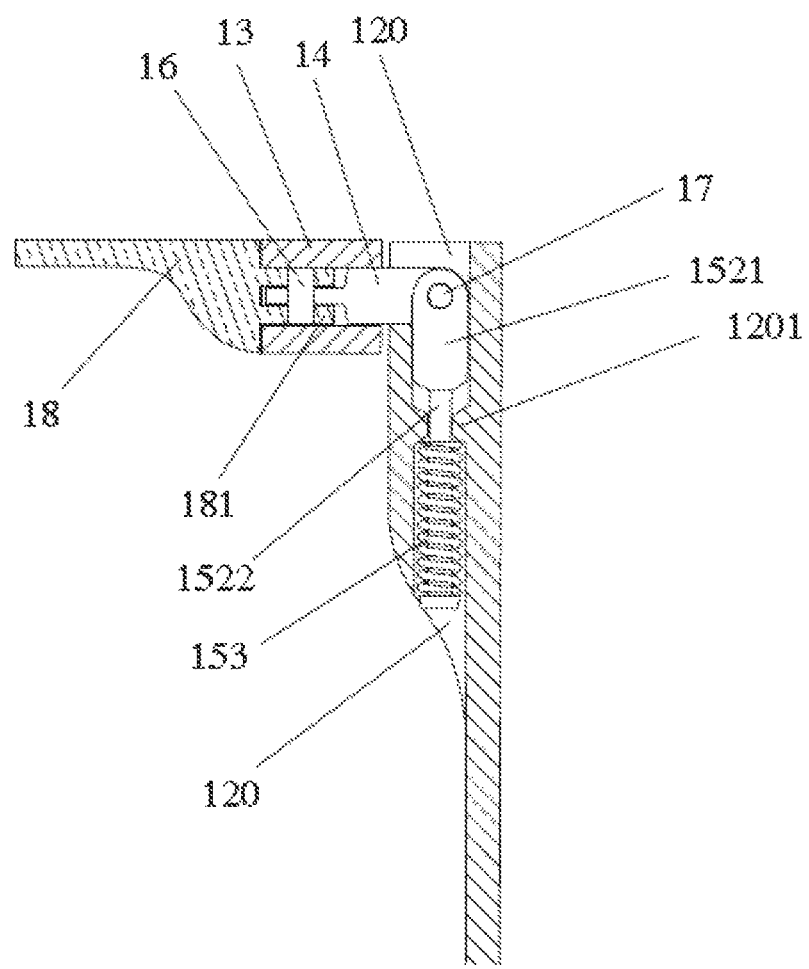
FIG. 9 is a top cross-sectional view of a temple assembly for a pair of spectacles according to an embodiment 3 of the present application.

Referring to FIG. 8 and FIG. 9, the temple assembly for the pair of spectacles provided by this embodiment is substantially the same as that of the embodiment 1, except that in the embodiment, the first pivot 16 is vertically distributed, and the second pivot 17 is horizontally distributed.

The temple assembly for the pair of spectacles provided in this embodiment is different from the embodiment 1 in that the temple assembly further includes a spectacle temple front hinge 18, and the spectacle temple front hinge 18 includes a hinge lug 181, the hinge lug 181 is arranged such that when the temple assembly is assembled, the hinge lug 181 extends into the through hole of the guide member 13, and the hinge lug 181 is in the through hole of the guide member 13 and pivotally connected to the first connecting end 141 of the first temple core 14, and pivotally connected by the first pivot 16. In the embodiment, when the temple assembly is assembled, the spectacle temple front hinge 18 is in series with the guide member 13 and the spectacle temple body 12 by the first temple core 14 and the second temple core 15, thus forming a pair of spectacle temples, when subjected to a vertical load, the spectacle temples generate a vertical elastic bending and elastic swing between the guide member 13 and the spectacle temple front hinge 18; and when subjected to a horizontal load, the spectacle temples generate a horizontal elastic bending and elastic swing between the guide member 13 and the spectacle temple body 12. The state at the time of receiving the load in the horizontal direction includes: the normal opening and closing of the spectacle temples between the guide member 13 and the spectacle temple body 12. Referring to FIG. 9, there is shown a state in which the spectacle temple of the present embodiment is normally closed, that is, a state in which the spectacle temple body 12 is bent in the horizontal direction by approximately 90 degrees with respect to the guide member 13.

The temple assembly for the pair of spectacles provided in this embodiment is different from the embodiment 1 in that the second temple core 15 of the temple assembly for the pair of spectacles herein does not include the fixing member 151, but at least includes the movable member 152 and the spring 153, the movable member 152 can reciprocate along the lengthwise direction of the spectacle temple body in the receiving cavity 120, the spring can be pulled by the movable member to the outside of the receiving cavity, and a blocking portion is provided in the receiving cavity to prevent the spring from being pulled outwardly; the front end of the movable member 152 is provided with a pivot hole for pivotal connection with the second connecting end of the first temple core. Specifically, in the embodiment of the present application, the movable member 152 also includes a hinge head 1521 and a spring core rod 1522, the front end of the hinge head 1521 is pivotally connected to the second connecting end 142 of the first temple core 14. Here, please refer to the FIG. 9, the cross-sectional view of the spectacle temple body 12 shows that in the receiving cavity 120, a blocking portion 1201 protruding from the peripheral wall of the receiving cavity into the receiving cavity is provided, and when the spring core rod 1522 passes through the blocking portion 1201 and fixedly connected to the hinge head 1521, one end of the spring 153 abuts against the blocking portion 1201, and the other end of the spring abuts against the spring stop head 1523.

Embodiment 4

Figure 10:
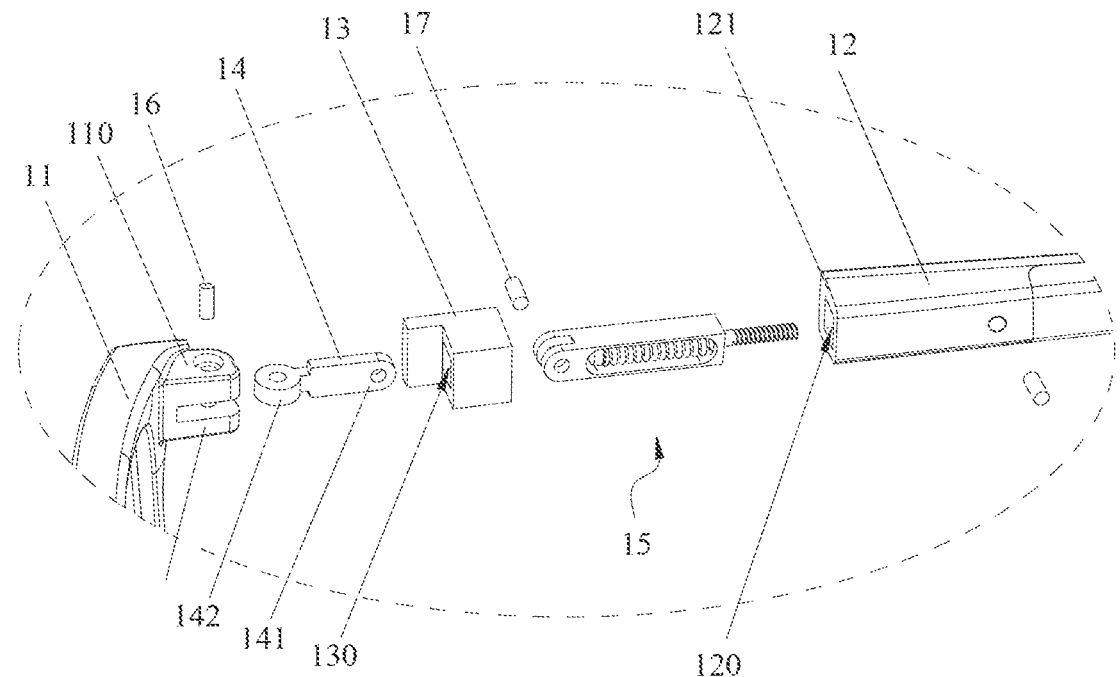
FIG. 10 is a partially exploded perspective view of a temple assembly for a pair of spectacles according to an embodiment 4 of the present application.
Figure 11:
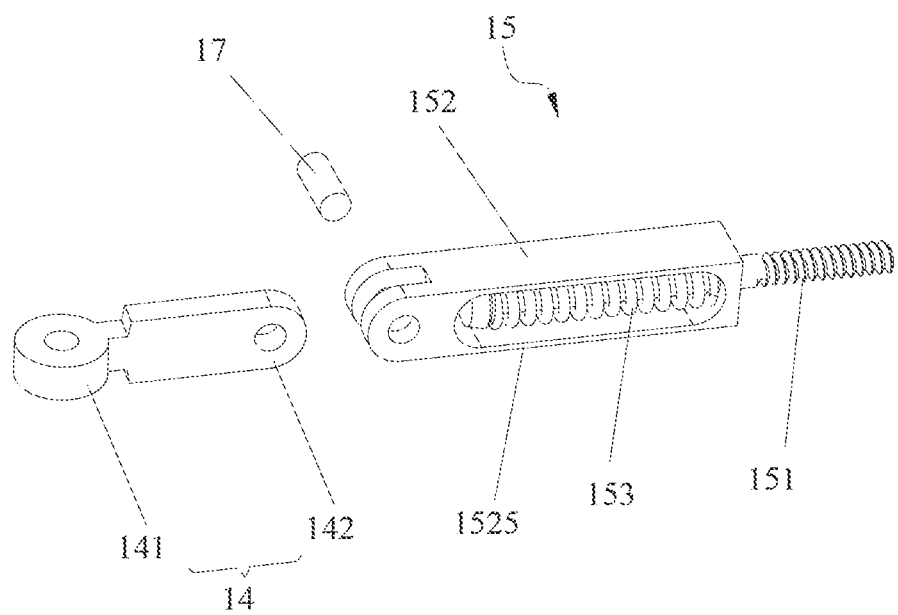
FIG. 11 is a perspective view of a first temple core and a second temple core in a temple assembly for a pair of spectacles according to an embodiment 4 of the present application.

Referring to FIG. 10 and FIG. 11, the temple assembly for the pair of spectacles provided by this embodiment is basically the same as that of the embodiment 2, except that the movable member 152 included in the second temple core 15 includes a frame 1525 and a front end of the frame is provided with a pivot hole for pivotally connecting with the second connecting end 142 of the first temple core, and the frame pulls out of the spring 153 received therein from the receiving cavity 120 of the spectacle temple body 12, and the fixing member 151 prevents it from being pulled outwardly. Specifically, in this embodiment, an end of the fixing member 151 provided with the spring stop head is extended into the frame 1525, and the spring 153 is disposed on the periphery of the fixing member 151, the spring 153 is limited in the frame 1525, and the other end of the fixing member 151 is fixed to the spectacle temple body 12 through a groove wall of the frame away from the end with the pivot hole. In this way, one end of the spring 153 abuts against the groove wall at the rear end of the frame 1525, and the other end of the spring 153 abuts the spring stop head of the fixing member 151 which extends into the inner end of the frame 1525. When being pulled by the first temple core, the movable member 152 moves outside the receiving cavity of the spectacle temple body 12, and the frame 1525 cooperates with the fixing member to compress the spring 153. When the external force is removed, the spring 153 is stretched, and the movable member 152 is pushed back to the original position by the spring 153.

Embodiment 5

Figure 12:
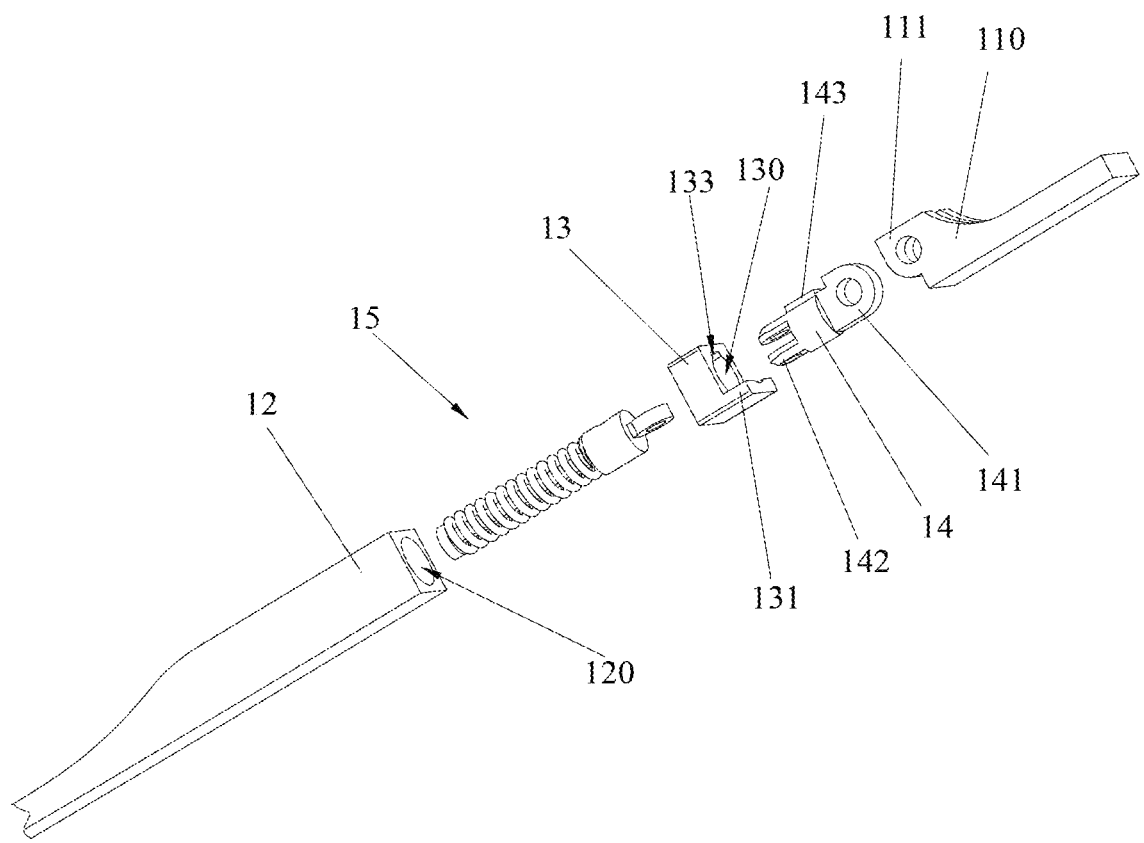
FIG. 12 is a perspective partial exploded view of a pair of spectacles provided in an embodiment 5 of the present application.
Figure 13:
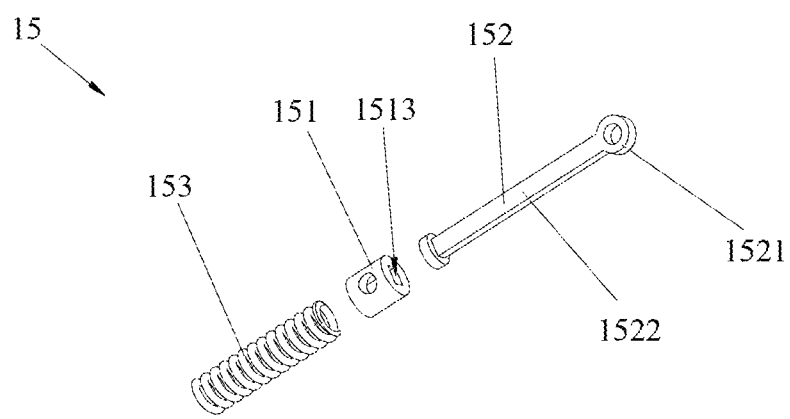
FIG. 13 is a perspective schematic view of a second temple core of a temple assembly for a pair of spectacles provided in an embodiment 5 of the present application.

Referring to FIG. 12 and FIG. 13, the temple assembly provided in this embodiment is basically the same as that in the embodiment 2, except for the following:

An inner wall of the through hole 130 of the guide member 13 is provided with a first axial limiting groove 133, an outer surface of the first temple core 14 is provided with an axial limiting rib 143 matched with the first axial limiting groove 133, and the axial limiting rib 143 extends into the first axial limiting groove 133 when the first temple core 14 passes through the through hole 130, such that the first temple core 14 moves along the through hole 130 to move axially, and cannot rotate circumferentially.

The movable member 152 comprises a hinge head 1521 and a spring core rod 1522. The fixing member 151 is provided with a second axial limiting groove 1513 configured for the spring core rod 1522 passing through, the spring core rod 1522 is matched with the second axial limiting groove 1513 (for example, the cross-sections of both have a matching rectangle or other the same shape), such that the spring core rod 1522 is axially moved along the second axial limiting groove 1513, and cannot rotate circumferentially.

Embodiment 6

Figure 14:
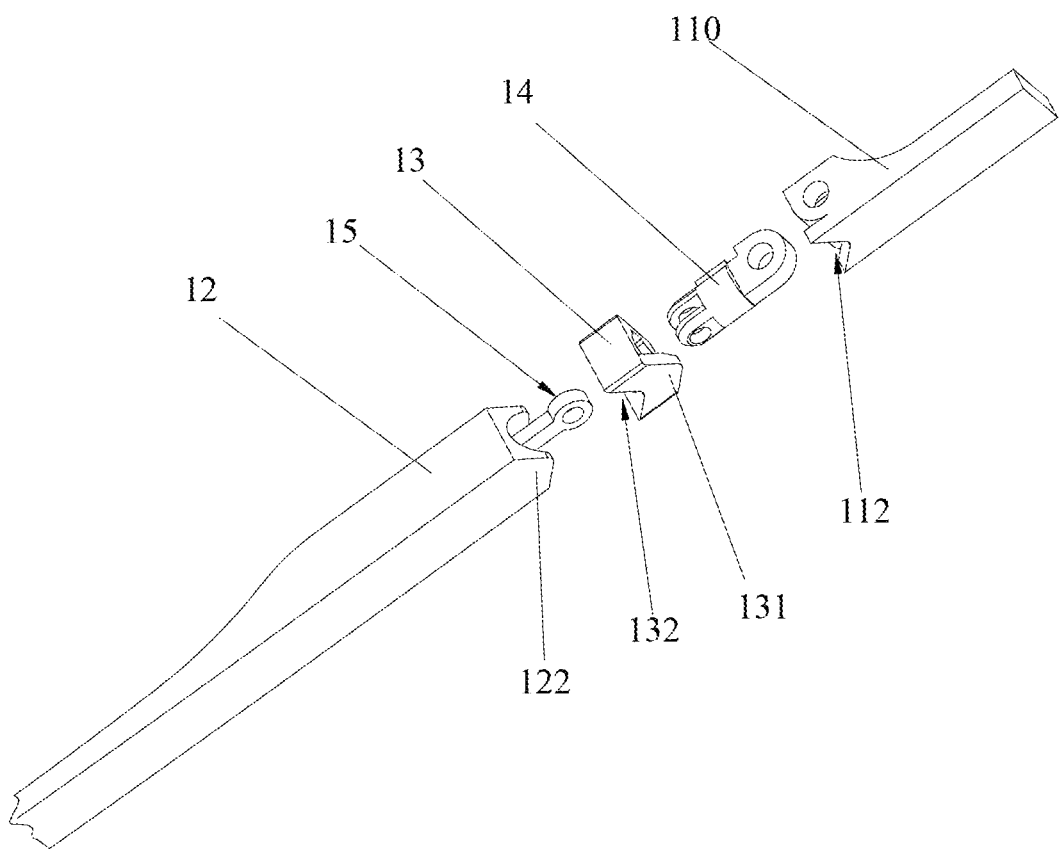
FIG. 14 is a perspective partial exploded view of a pair of spectacles provided in an embodiment 6 of the present application.

Referring to FIG. 14, the temple assembly provided in this embodiment is basically the same as that in the embodiment 1, except for the following:

The front end surface of the spectacle temple body 12 is provided with a convex portion 122, the rear end surface of the guide member 13 is provided with a concave portion 132, and the convex portion 122 is matched with the concave portion 132 to limit circumferential rotation between the spectacle temple body 12 and the guide member 13. Further, the longitudinal section of the convex portion 122 is triangular and the top end is rounded, and the longitudinal section of the concave portion 132 is recessed triangular and the inner end is rounded, such that facilitates the relative swing between the spectacle temple body 12 and the guide member 13.

It can be noted that, the guide member 13 and the spectacle temple body 12 can also be arranged into that the rear end surface of the guide member 13 is provided with a convex portion, the front end surface of the spectacle temple body 12 is provided with a concave portion, and the convex portion is matched with the concave portion to limit circumferential rotation between the spectacle temple body 12 and the guide member 13.

In the present embodiment, the limiting portion 131 of the front end surface of the guide member 13 is convex, the outer end surface of the pile head 110 that contacts the guide member 13 is provided with a concave groove 112, and the limiting portion 131 is matched with the concave groove 112 to limit the circumferential rotation between the pile head 110 and the guide member 13. Further, the longitudinal section of the limiting portion 131 is triangular and the top end is rounded, and the longitudinal section of the concave groove 112 is recessed triangular and the inner end is rounded. In this way, it is convenient for the guide member 13 to match with the pile head 110 when abutting.

Embodiment 7

Figure 15:
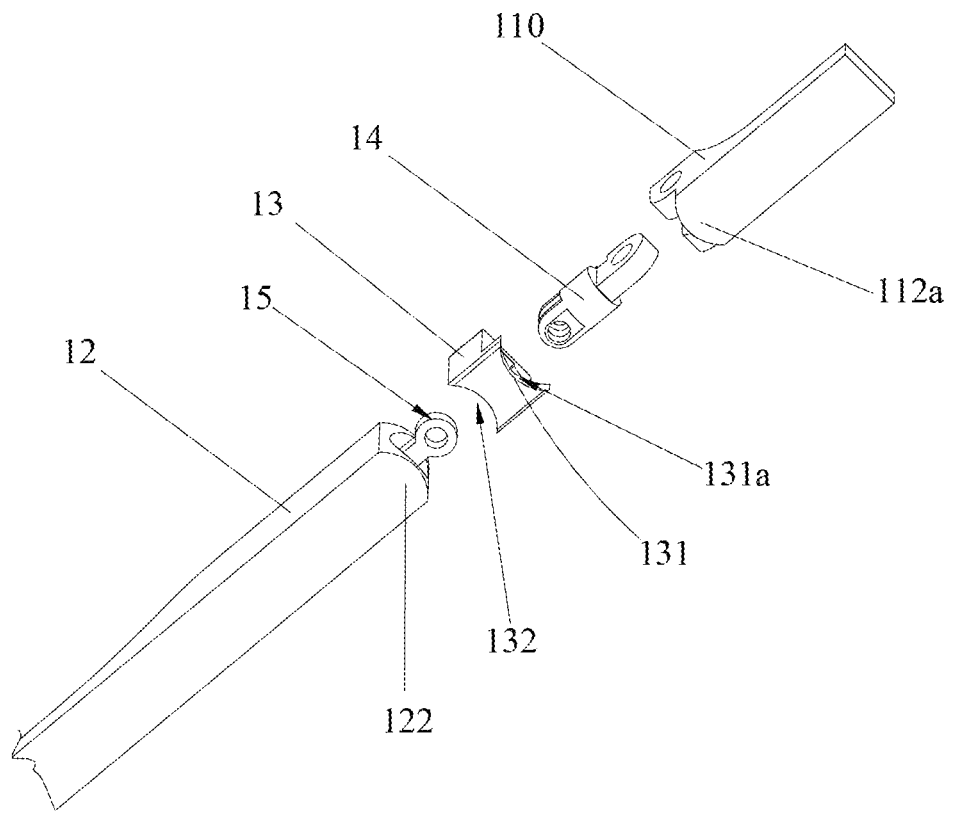
FIG. 15 is a perspective partial exploded view of a pair of spectacles provided in an embodiment 7 of the present application.

Referring to FIG. 15, the temple assembly provided in this embodiment is basically the same as that in the embodiment 1, except for the following:

The front end surface of the spectacle temple body 12 is provided with a convex portion 122, the rear end surface of the guide member 13 is provided with a concave portion 132, and the convex portion 122 is matched with the concave portion 132 to limit circumferential rotation between the spectacle temple body 12 and the guide member 13. Further, the longitudinal section of the convex portion 122 is in an arc shape, and the longitudinal section of the concave portion 132 is in an arc shape. In this way, the convex portion 122 and the concave portion 132 can be easily produced, and the spectacle temple body 12 and the guide member 13 can be relatively swayed easily.

In the embodiment, the temple assembly further comprises a pile head 110 connected with the first temple core 14 and abutted against the guide member 13; an outer end surface of the pile head 110 abutted against the guide member 13 is provided with an outer convex portion 112a, the limiting portion 131 of the front end surface of the guide member 13 is provided with a concave groove 131a, and the outer convex portion 112a is matched with the concave groove 131a to limit circumferential rotation between the pile head 110 and the guide member 13. Further, the longitudinal section of the outer convex portion 112a is in an arc shape, and the longitudinal section of the concave groove 131a is in an arc shape, which is convenient for the guide member 13 to match with the pile head 110 when abutting.

Embodiment 8

Figure 16:
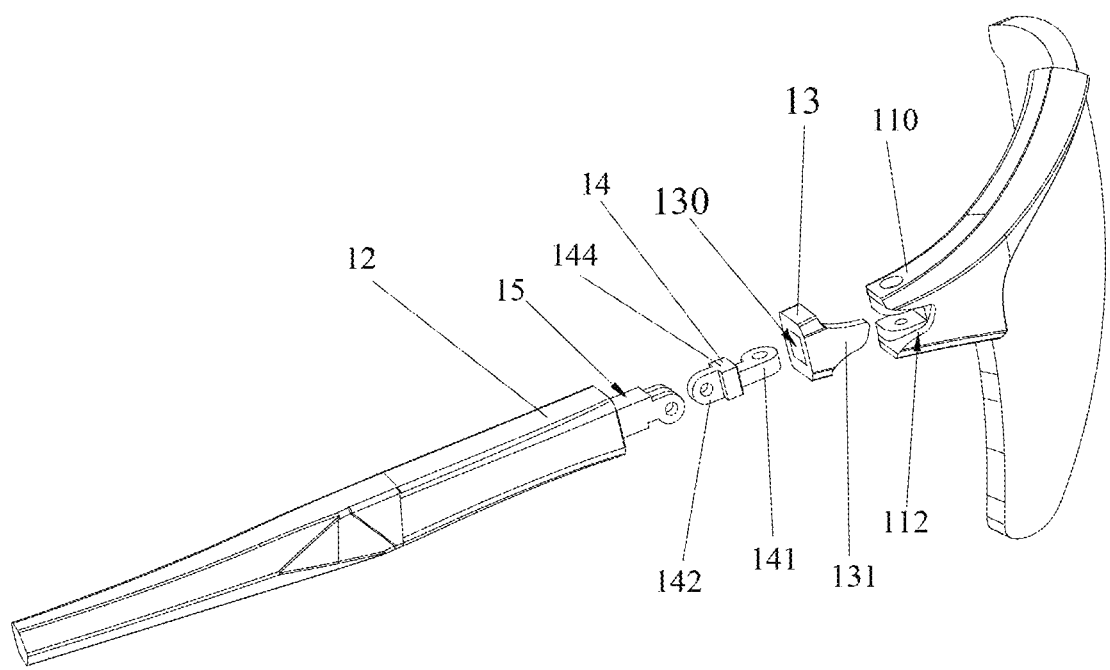
FIG. 16 is a perspective partial exploded view of a pair of spectacles provided in an embodiment 8 of the present application.

Referring to FIG. 16, the temple assembly provided in this embodiment is basically the same as that in the embodiment 4, except for the following:

The temple assembly further comprises a pile head 110 connected with the first temple core 14 and abutted against the guide member 13; the limiting portion 131 of the front end surface of the guide member 13 is convex, and an outer end surface of the pile head 110 abutted against the guide member 13 is provided with a concave groove 112, and the limiting portion 131 is matched with the concave groove 112 to limit circumferential rotation between the pile head 110 and the guide member 13. Further, the longitudinal section of the limiting portion 131 is triangular and the top end is obtuse angle, and the longitudinal section of the concave groove 112 is generally triangular and the inner end is obtuse angle. In this way, it is convenient for the guide member 13 to match with the pile head 110 when abutting.

Embodiment 9

Figure 17:
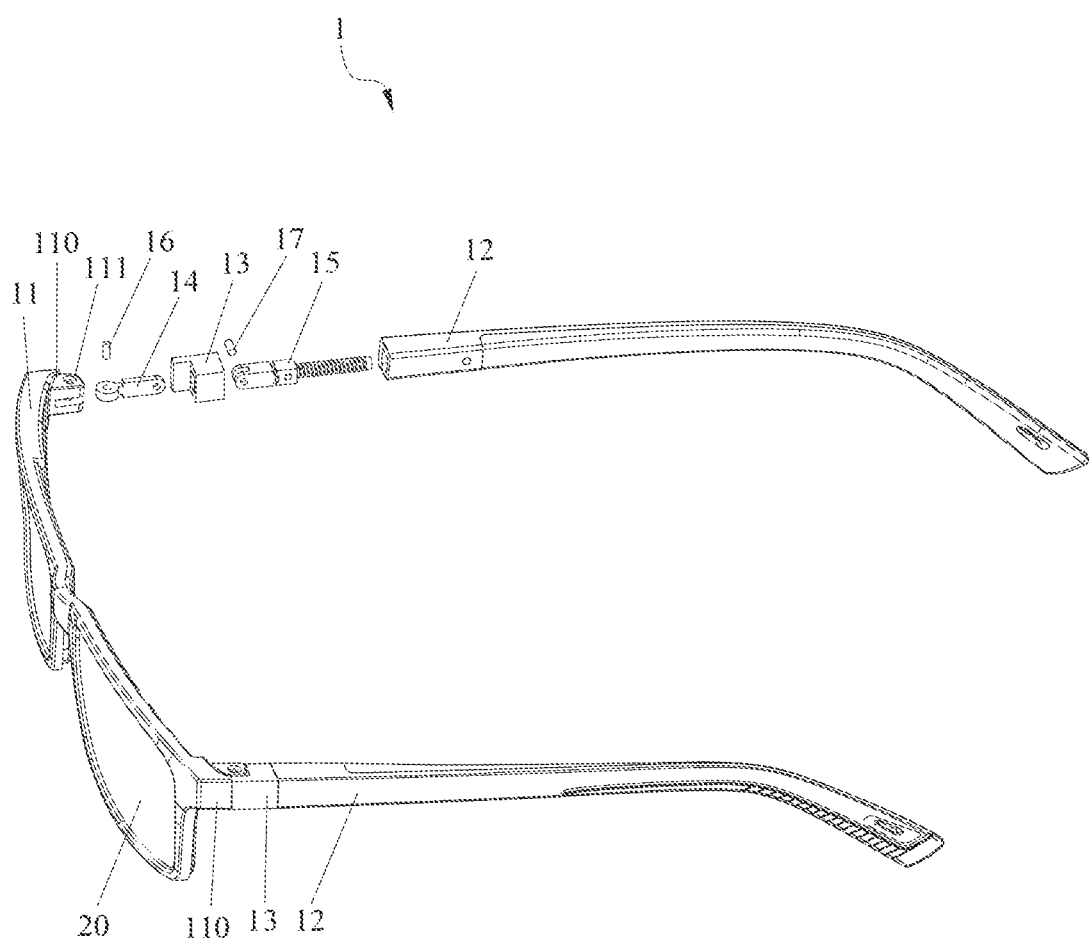
FIG. 17 is a perspective partial exploded view of a pair of spectacles provided in an embodiment 9 of the present application.

Referring to FIG. 17, an embodiment of the present application further provides a pair of spectacles 1 including a spectacle frame 10 and lenses 20, wherein the spectacle frame 10 includes a rim 11 and a temple assembly for the pair of spectacles described in any embodiment of the present application.

The present application provides a pair of spectacles 1, wherein the first temple core 14 is cooperated with the guide member 13, and the first temple core 14 and the second temple core 15 are cooperated with the guide member 13 and the spectacle temple body 12, such that the guide member 13 functions to define the swinging direction and the swing position of the spectacle temples, and when the spectacle temples are subjected to loads in two different direction, the spectacles temple cause to produce an elastic bend or an elastic swing at the different positions thereof. This makes it possible for the spectacle temple to produce a flexible opening and closing between the guide member 13 and the pile head 110 when the user put on or take off the spectacle to bring a horizontal load to the spectacle temple; when the user put on or take off the spectacle to bring a vertical load to the spectacle temple, an elastic opening and closing between the guide member 13 and the spectacle temple body 12 is generated. While slowing down or eliminating the bad load on the spectacle temples in the vertical direction, it also increases the life of the most important hinge shaft on the spectacle temples. The technical problem that the spectacle temples cannot bear the vertical load is effectively solved and prevented the spectacle temples from accidental deforming. In addition, when the temple assembly is mounted on the rim, the feeling of random sway caused by elastic bending or elastic swing in horizontal and vertical directions in the same portion of the spectacle frame is avoided.

The aforementioned embodiments are only preferred embodiments of the present application. For one of ordinary skill in the art, according to the thought of the present application, specific implementation modes and application scopes may be modified, and the content of the specification should not be interpreted as any limitation to the present application.

What is claimed is:

1. A temple assembly for a pair of spectacles, comprising:
    a spectacle temple body;
    a first temple core, comprising a first connecting end and a second connecting end which are disposed opposite to each other;
    a second temple core, elastically connected with the spectacle temple body and configured to provide an elastic force along a lengthwise direction of the spectacle temple body;
    a first pivot; configured to connect the first connecting with a pile head of a rim or an end hinge of a spectacle temple;
    a second pivot, distributed perpendicular to the first pivot and configured to connect the second connecting end and the second temple core;
    a guide member, sleeved onto a periphery of the first temple core and configured such that the second connecting end of the first temple core extends out of a rear end of the guide member, the guide member is in elastic abutment against the spectacle temple body and is configured to limit a swing position and a swing direction of the spectacle temple body; and
    wherein a front end surface of the spectacle temple body is provided with a convex portion, a rear end surface of the guide member is provided with a concave portion, and the convex portion is matched with the concave portion to limit circumferential rotation between the spectacle temple body and the guide member; or
    a rear end surface of the guide member is provided with a convex portion, a front end surface of the spectacle temple body is provided with a concave portion, and the convex portion is matched with the concave portion to limit circumferential rotation between the spectacle temple body and the guide member.

2. The temple assembly of claim 1, wherein the guide member is provided with a through hole, the first temple core is disposed passing through the through hole such that the guide member is sleeved onto a periphery of the first temple core, and the through hole is configured to define the first temple core reciprocating along an axis of the through hole.

3. The temple assembly of claim 1, wherein the first temple core and the guide member are constrained to have a relative movement in same direction as an axial direction of the first pivot.

4. The temple assembly of claim 1, wherein the guide member is provided with a through hole, the second connecting end of the first temple core passes through the through hole and extends into the spectacle temple body, and the second connecting end is pivotally connected to the second temple core by the second pivot in the spectacle temple body.

5. The temple assembly of claim 1, wherein a shape of a cross-section of a part of the first temple core located between the first connecting end and the second connecting end is matched with that of a cross-section of a through hole of the guide member, to limit the guide member can only move axially relative to the first temple core, to limit rotating circumferentially.

6. The temple assembly of claim 1, wherein the axes of the first pivot are horizontally or vertically arranged.

7. The temple assembly of claim 1, wherein the guide member is provided with a through hole, the temple assembly further comprises the end hinge of the spectacle temple, and the end hinge of the spectacle temple comprises a hinge lug extending into the through hole and pivotally connected to the first connecting end.

8. The temple assembly of claim 1, wherein the guide member is protruded with a limiting portion extending forward from an end of the guide member away from the spectacle temple body.

9. The temple assembly of claim 8, wherein the temple assembly further comprises a pile head connected with the first temple core and abutted against the guide member;
   wherein an outer end surface of the pile head abutted against the guide member is provided with an outer convex portion, the limiting portion is provided with a concave groove, and the outer convex portion is matched with the concave groove to limit circumferential rotation between the pile head and the guide member; or
   the limiting portion is convex, and an outer end surface of the pile head abutted against the guide member is provided with a concave groove, and the limiting portion is matched with the concave groove to limit circumferential rotation between the pile head and the guide member.

10. The temple assembly of claim 1, wherein an end of the spectacle temple body adjacent to the guide member is provided with a receiving cavity, the second temple core is received in the receiving cavity and the second temple core is elastically stretchable along the length of the spectacle temple body.

11. The temple assembly of claim 10, wherein the second connecting end is extended into the receiving cavity and pivotally connected to the second temple core.

12. The temple assembly of claim 10, wherein the second temple core comprises:
   a movable member, received in the receiving cavity and reciprocally movable along the lengthwise direction of the spectacle temple body, wherein a front end of the moveable member is provided with a pivot hole; and
   a spring, can be pulled toward the out of the receiving cavity by the movable member, wherein the receiving cavity is provided with a blocking portion therein, and the blocking portion is configured to prevent the spring from being pulled out of the receiving cavity by the movable member.

13. The temple assembly of claim 1, wherein the second temple core comprises:
   a fixing member, fixedly connected to the spectacle temple body;
   a movable member, movably connected to the fixing member; wherein the movable member is reciprocally movable along the lengthwise direction of the spectacle temple body, and a front end of the movable member is provided with a pivot hole configured for the second pivot to pass through; and
   a spring;
   wherein an end of the spring abuts against the fixing member, and the other end thereof abuts against the movable member.

14. The temple assembly of claim 13, wherein the fixing member, the movable member and the spring are distributed along the lengthwise direction of the spectacle temple body.

15. The temple assembly of claim 13, wherein the movable member comprises a hinge head and a spring core rod, the pivot hole is disposed at a front end of the hinge head, and the spring core rod is fixedly connected to the hinge head or integrally formed with the hinge head, the spring is sleeved on the spring core rod, and a rear end of the spring core rod is provided with a spring stop.

16. The temple assembly of claim 15, wherein the fixing member is a fixed locking block sleeved on the spring core rod, and the fixing member is provided with a screw hole or a pin hole.

17. The temple assembly of claim 16, wherein the fixing member is provided with a second axial limiting groove configured for the spring core rod passing through, the spring core rod is matched with the second axial limiting groove, such that the spring core rod is axially moved along the second axial limiting groove.

18. The temple assembly of claim 13, wherein the movable member comprises a frame, a front end of the frame is provided with the pivot hole, and the frame is configured to pull the spring received in the frame out of the receiving cavity of the spectacle temple body, and the fixing member is configured to prevent the spring from being pulled out of the receiving cavity by the frame.

19. The temple assembly of claim 18, wherein an end of the fixing member is extended into the frame, the spring is sleeved on a periphery of the fixing member and defined in the frame, and the other end of the fixing member passes through a rear end of the frame and is fixedly connected to the spectacle temple body.

20. A pair of spectacles, comprising: a spectacle frame and lenses, wherein the spectacle frame comprises a pair of rims configured to inlay the lenses thereon; and
   a temple assembly for a pair of spectacles, the temple assembly comprising:
   a spectacle temple body;
   a first temple core comprising a first connecting end and a second connecting end which are disposed opposite to each other;
   a second temple core elastically connected to the spectacle temple body and configured to provide an elastic force along a lengthwise direction of the spectacle temple body;
   a first pivot, configured to pivotally connect the first connecting end with a pile head of a rim or an end hinge of a spectacle temple;
   a second pivot, disposed perpendicular to the first pivot and configured to connect the second connection end with the second temple core;
   a guide member, sleeved onto a periphery of the first temple core and in elastic abutment against the spectacle temple body and configured to define a swinging position and a swinging direction of the spectacle temple body; and
   wherein a front end surface of the spectacle temple body is provided with a convex portion, a rear end surface of the guide member is provided with a concave portion, and the convex portion is matched with the concave portion to limit circumferential rotation between the spectacle temple body and the guide member; or
   a rear end surface of the guide member is provided with a convex portion, a front end surface of the spectacle temple body is provided with a concave portion, and the convex portion is matched with the concave portion to limit circumferential rotation between the spectacle temple body and the guide member.

21. A temple assembly for a pair of spectacles, comprising:
   a spectacle temple body;
   a first temple core, comprising a first connecting end and a second connecting end which are disposed opposite to each other;

a second temple core, elastically connected with the spectacle temple body and configured to provide an elastic force along a lengthwise direction of the spectacle temple body;

a first pivot; configured to connect the first connecting with a pile head of a rim or an end hinge of a spectacle temple;

a second pivot, distributed perpendicular to the first pivot and configured to connect the second connecting end and the second temple core;

a guide member, sleeved onto a periphery of the first temple core and configured such that the second connecting end of the first temple core extends out of a rear end of the guide member, the guide member is in elastic abutment against the spectacle temple body and is configured to limit a swing position and a swing direction of the spectacle temple body; and wherein the guide member is provided with a through hole, and an inner wall of the through hole is provided with a first axial limiting groove, an outer surface of the first temple core is provided with an axial limiting rib matched with the first axial limiting groove, and the axial limiting rib extends into the first axial limiting groove when the first temple core passes through the through hole, such that the first temple core moves along the through hole to limit rotating circumferentially.

22. A temple assembly for a pair of spectacles, comprising:

a spectacle temple body;

a first temple core, comprising a first connecting end and a second connecting end which are disposed opposite to each other;

a second temple core, elastically connected with the spectacle temple body and configured to provide an elastic force along a lengthwise direction of the spectacle temple body;

a first pivot; configured to connect the first connecting with a pile head of a rim or an end hinge of a spectacle temple;

a second pivot, distributed perpendicular to the first pivot and configured to connect the second connecting end and the second temple core;

a guide member, sleeved onto a periphery of the first temple core and configured such that the second connecting end of the first temple core extends out of a rear end of the guide member, the guide member is in elastic abutment against the spectacle temple body and is configured to limit a swing position and a swing direction of the spectacle temple body;

wherein the guide member is protruded with a limiting portion extending forward from an end of the guide member away from the spectacle temple body; and wherein the temple assembly further comprises a pile head connected with the first temple core and abutted against the guide member;

wherein an outer end surface of the pile head abutted against the guide member is provided with an outer convex portion, the limiting portion is provided with a concave groove, and the outer convex portion is matched with the concave groove to limit circumferential rotation between the pile head and the guide member; or the limiting portion is convex, and an outer end surface of the pile head abutted against the guide member is provided with a concave groove, and the limiting portion is matched with the concave groove to limit circumferential rotation between the pile head and the guide member.

* * * * *